United States Patent
Lee et al.

(10) Patent No.: US 10,540,134 B2
(45) Date of Patent: Jan. 21, 2020

(54) DISPLAY APPARATUS AND CONTROLLING METHOD THEREOF

(71) Applicant: SAMSUNG ELECTRONICS CO., LTD., Suwon-si (KR)

(72) Inventors: Seung-hun Lee, Anyang-si (KR); Young-kook Kim, Seongnam-si (KR); Ju Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 15/796,132

(22) Filed: Oct. 27, 2017

(65) Prior Publication Data

US 2018/0136894 A1 May 17, 2018

(30) Foreign Application Priority Data

Nov. 17, 2016 (KR) .......................... 10-2016-0153021

(51) Int. Cl.
*G06F 3/14* (2006.01)
*G09G 5/00* (2006.01)
*G09G 5/14* (2006.01)

(52) U.S. Cl.
CPC ........... *G06F 3/1446* (2013.01); *G09G 5/003* (2013.01); *G09G 5/14* (2013.01); *G09G 2300/026* (2013.01); *G09G 2320/0626* (2013.01); *G09G 2330/021* (2013.01); *G09G 2330/12* (2013.01); *G09G 2354/00* (2013.01); *G09G 2360/08* (2013.01)

(58) Field of Classification Search
CPC ........... G06F 3/1446; G06F 1/30; G09G 5/14; G09G 2330/021; G09G 2300/026; G09G 2360/08; G09G 2330/12; G09G 2330/02; G09G 2330/023
See application file for complete search history.

(56) References Cited

U.S. PATENT DOCUMENTS

| | | | | |
|---|---|---|---|---|
| 7,312,771 | B2 * | 12/2007 | Iwamura | G06F 1/3203 345/211 |
| 7,502,950 | B1 * | 3/2009 | Brands | G06F 3/1446 323/234 |
| 9,412,336 | B2 | 8/2016 | Bastani et al. | |
| 9,727,896 | B2 * | 8/2017 | Richardson | G06Q 30/0267 |

(Continued)

FOREIGN PATENT DOCUMENTS

| | | |
|---|---|---|
| JP | 2010-2770 A | 1/2010 |
| JP | 2010-271339 A | 12/2010 |

(Continued)

OTHER PUBLICATIONS

Communication dated Mar. 15, 2018, issued by the European Patent Office in counterpart European Application No. 17198766.2.

(Continued)

*Primary Examiner* — Todd Buttram
(74) *Attorney, Agent, or Firm* — Sughrue Mion, PLLC

(57) ABSTRACT

A display apparatus includes a display that displays at least a first part of an image, a power supply that supplies power to the display apparatus and an input/output port that connects in parallel the power supply and another power supply of another display apparatus that displays at least a second part of the image.

22 Claims, 7 Drawing Sheets

(56) References Cited

U.S. PATENT DOCUMENTS

| | | | |
|---|---|---|---|
| 2006/0119543 A1* | 6/2006 | Hu | G09G 3/3208 |
| | | | 345/45 |
| 2007/0109290 A1* | 5/2007 | Lee | G09G 5/003 |
| | | | 345/211 |
| 2009/0109168 A1 | 4/2009 | Lee et al. | |
| 2009/0146607 A1* | 6/2009 | Yang | H02J 7/0054 |
| | | | 320/103 |
| 2009/0312884 A1* | 12/2009 | Li | G06F 3/1446 |
| | | | 700/295 |
| 2010/0295839 A1 | 11/2010 | Nagaya et al. | |
| 2014/0063878 A1* | 3/2014 | Tsai | H02J 1/10 |
| | | | 363/74 |
| 2015/0066185 A1 | 3/2015 | Kim et al. | |
| 2015/0348493 A1* | 12/2015 | Chae | G09G 5/00 |
| | | | 345/212 |
| 2016/0094152 A1* | 3/2016 | Geil | H02J 3/14 |
| | | | 363/123 |
| 2018/0040268 A1* | 2/2018 | Murai | G02F 1/133512 |

FOREIGN PATENT DOCUMENTS

| | | |
|---|---|---|
| JP | 5419032 B2 | 2/2014 |
| JP | 5620830 B2 | 11/2014 |

OTHER PUBLICATIONS

Communication dated Jan. 22, 2019, issued by the European Patent Office in counterpart European Application No. 17198766.2.

* cited by examiner

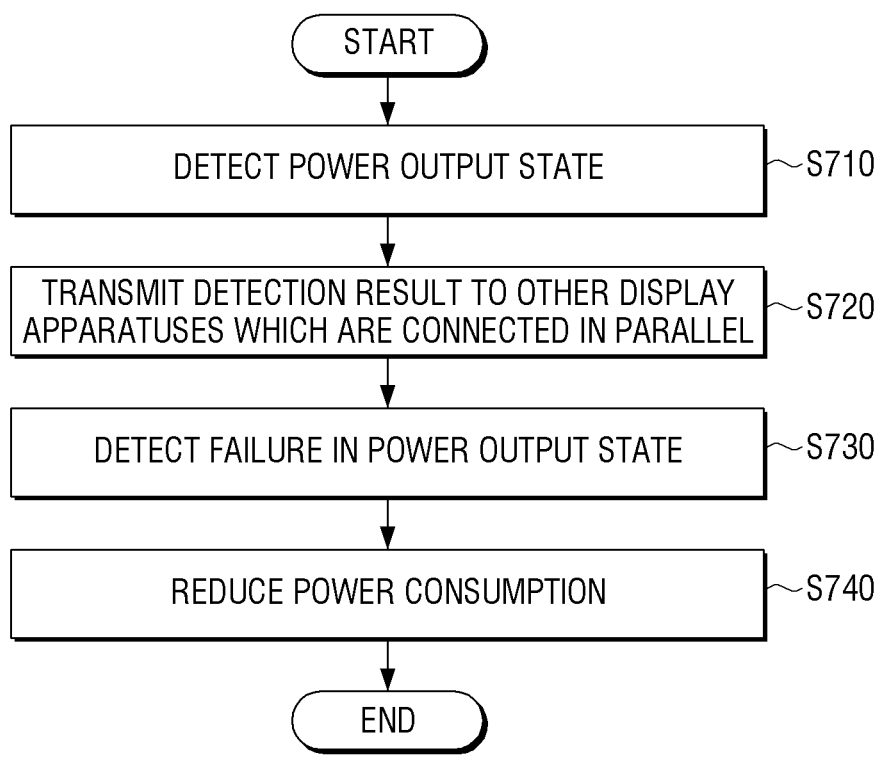

DISPLAY APPARATUS AND CONTROLLING METHOD THEREOF

CROSS-REFERENCE TO RELATED APPLICATIONS

This application claims priority from Korean Patent Application No. 10-2016-0153021, filed on Nov. 17, 2016 in the Korean Intellectual Property Office, the disclosure of which is incorporated herein by reference in its entirety.

BACKGROUND

1. Field

Devices and methods consistent with the present disclosure relate to a display apparatus and a controlling method thereof, and more particularly, to a display apparatus capable of sharing power with another display apparatus and a controlling method thereof.

2. Description of the Related Art

A display system including a plurality of display devices is commonly used in a field of advertisement, entertainment, sports, or broadcasting for displaying an image.

For example, the display system including a plurality of display devices may be used in an exhibition or the like. Each of the respective display devices of the display system display the same image at the same time or display different images to express one whole image.

When a plurality of display devices are connected and used, if the power of one or more of the display devices is defective and the image cannot be displayed on the screen of the one or more of the display devices, the utilization of the display system is drastically decreased. Specifically, when one full image is displayed using a plurality of display apparatuses and the screens of the one or more display devices are turned off, consumers may be very sensitive to this problem and the system cannot be used until the normal operation is performed by replacing the defective component. For example, in a place where the display system is continuously used, such as a situation room of a broadcasting station or a public institution, when a problem arises, measures to quickly resolve the problem are required.

SUMMARY

According to an aspect of the exemplary embodiment, there is provided a display apparatus, comprising: a display configured to display at least a first part of an image, a power supply configured to supply power to the display apparatus and an input/output port configured to connect in parallel the power supply and another power supply of another display apparatus that displays at least a second part of the image.

The display apparatus may further comprise: a detector configured to detect a power output state of the power supply and generate a detection result and a processor configured to transmit the detection result to the other display apparatus.

The processor may be further configured to reduce power consumption of the display apparatus in response to detecting one of a failure of the power supply of the display apparatus based on the detection result, and a failure of the other power supply of the other display apparatus based on power state information received from the other display apparatus.

The processor may be further configured to control the display to reduce a brightness value of the image displayed on the display by a predetermined ratio.

The predetermined ratio may correspond to a number of display apparatuses having defective power supply.

The processor may be further configured to, in response to detecting the failure of the other power supply of the other display apparatus, control the display to display a user interface for receiving an input selection regarding whether to reduce power consumption in the display apparatus based on a number of display apparatuses having defective power supply.

The input/output port may be connected to another input/output port of the other display apparatus via a cable.

The power supply may be configured to generate a plurality of direct current (DC) power levels, and the input/output port may include a plurality of terminals which connect in parallel each of the plurality of DC power levels.

According to an aspect of the exemplary embodiment, there is provided a controlling method of a display apparatus, the controlling method comprising: receiving power state information of another display apparatus, which is connected in parallel with the display apparatus, detecting a failure of another power supply of the other display apparatus based on the received power state information and in response to detecting the failure of the other power supply of the other display apparatus, reducing power consumption of the display apparatus.

The controlling method may further comprise: detecting a power output state of the display apparatus, transmitting a result of the detecting to the other display apparatus through an input/output port which connects in parallel a power supply of the display apparatus and the other power supply of the other display apparatus and in response to detecting a failure of the power supply of the display apparatus based on the result of the detecting, reducing the power consumption of the display apparatus.

The input/output port may be connected to another input/output port of the other display apparatus via a cable.

The power supply of the display apparatus may generate a plurality of direct current (DC) power levels, and the input/output port may include a plurality of terminals which connect in parallel each of the plurality of DC power levels.

The reducing the power consumption may comprise reducing a brightness value of an image displayed on a display by a predetermined ratio.

The predetermined ratio may correspond to a number of display apparatuses having defective power supply.

The controlling method may further comprise: displaying a user interface for receiving a selection regarding whether to reduce the power consumption in the display apparatus based on a number of display apparatuses having defective power supply.

According to an aspect of the exemplary embodiment, there is provided a non-transitory computer readable recording medium including a program to execute a controlling method of a display apparatus, wherein the controlling method of the display apparatus comprises: receiving power state information of another display apparatus, which is connected in parallel with the display apparatus, detecting a failure of a another power supply of the other display apparatus based on the received power state information and in response to detecting the failure of the other power supply of the other display apparatus, reducing power consumption of the display apparatus.

According to an aspect of the exemplary embodiment, there is provided a display system comprising: a plurality of display apparatus, wherein a first display apparatus, among the plurality of display apparatus, comprises: a display configured to display content, a first power supply configured to provide power to the display and a processor configured to control providing of power to a second display apparatus, in response to receiving information indicating that a second power supply of the second display apparatus is defective.

The processor of the first display apparatus may be further configured to control the first power supply of the first display apparatus to provide the power to the second display apparatus.

The processor of the first display apparatus may be further configured to control the first display apparatus to operate in a first power state that is lower than a second power state, the second power state being a power state at which the first display apparatus operates at prior to the processor controlling the providing of the power to the second display apparatus.

The first display apparatus may further comprise a connector configured to facilitate the providing of the power to the second display apparatus.

The display system may further comprise a node configured to aggregate the power provided from the first display apparatus and power provided from a third display apparatus, different from the second display apparatus, and provide the aggregated power to the second display apparatus.

According to an aspect of the exemplary embodiment, there is provided a display apparatus comprising: a display configured to display content, a power supply configured to provide power to the display and a processor configured to control providing of power to another display apparatus, in response to receiving information indicating that another power supply of the other display apparatus is defective.

The processor may be further configured to control the power supply of the display apparatus to provide the power to the other display apparatus.

The processor may be further configured to control the display apparatus to operate in a first power state that is lower than a second power state, the second power state being a power state at which the display apparatus operates at prior to the processor controlling the providing of the power to the other display apparatus.

The display apparatus may further comprise a connector configured to facilitate the providing of the power to the other display apparatus.

According to an aspect of the exemplary embodiment, there is provided a controlling method of a display apparatus, the controlling method comprising: displaying a content on a display of the display apparatus, supplying, by a power supply of the display apparatus, power to the display and controlling, by a processor of the display apparatus, power provided from the power supply of the display apparatus to another display apparatus, in response to receiving information indicating that another power supply of the other display apparatus is defective.

BRIEF DESCRIPTION OF THE DRAWINGS

The above and/or other aspects will be more apparent by describing certain exemplary embodiments with reference to the accompanying drawings, in which:

FIG. 7 is a flowchart illustrating a power sharing method of a display apparatus according to an exemplary embodiment.

DETAILED DESCRIPTION OF EXEMPLARY EMBODIMENTS

Figure 1:
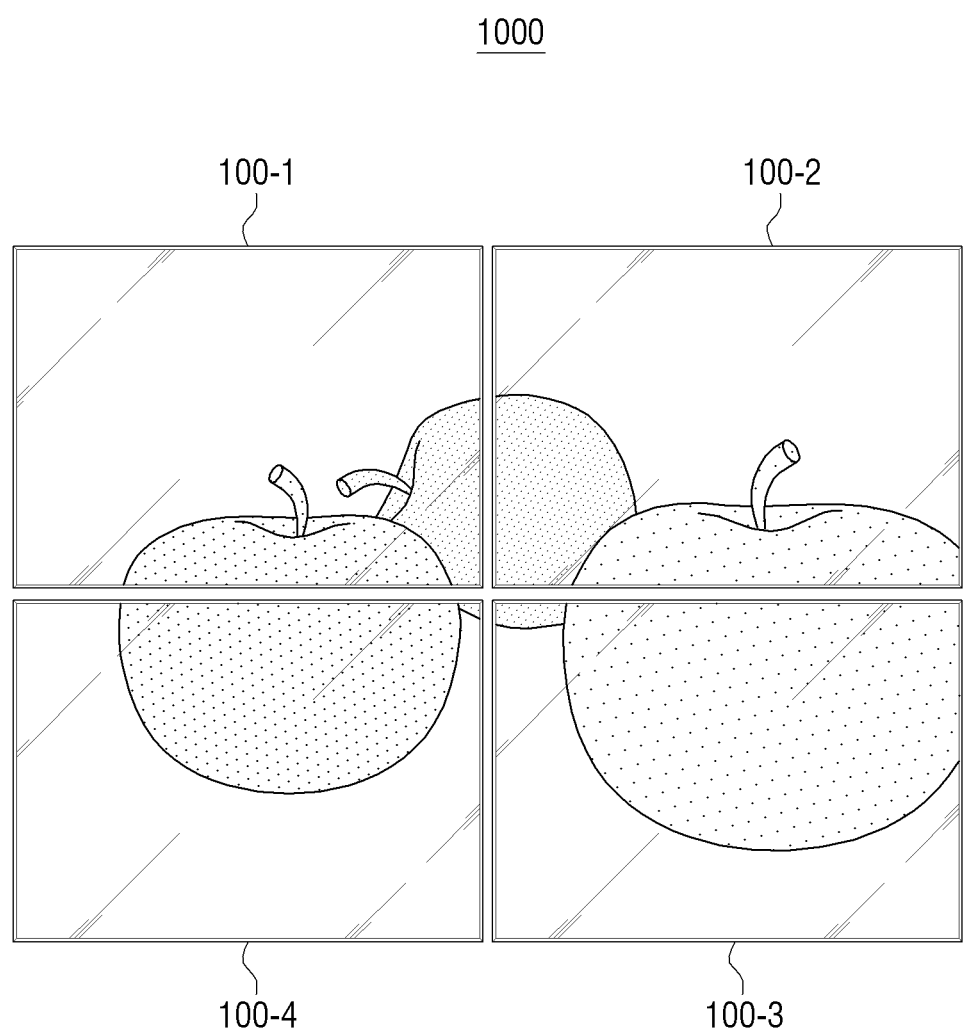
FIG. 1 is a schematic view illustrating a display system including a plurality of display apparatuses according to an exemplary embodiment.

Hereinafter, the terms used in exemplary embodiments will be briefly explained, and exemplary embodiments will be described in greater detail.

Terms used in the present disclosure are general terminologies currently widely used in consideration of the configuration and functions of the present disclosure, but may vary depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The exemplary embodiments may vary, and may be provided in different examples. Various exemplary embodiments will be described with reference to accompanying drawings. However, this is not intended to limit the scope of an exemplary embodiment, and therefore, it should be understood that all the modifications, equivalents or substitutes included under the invented spirit and technical scope are encompassed. In describing the exemplary embodiments, well-known functions or constructions are not described in detail if it is believe that they would obscure the specification with unnecessary detail.

The terms such as "first," "second," and so on may be used to describe a variety of elements, but the elements should not be limited by these terms. The terms are used simply to distinguish one element from other elements.

A singular form includes a plural form unless the content clearly indicates otherwise. The terms, "include", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or 'units' may be integrated into at least one module and may be realized as at least one processor in an integrated manner except for 'modules' or 'units' that should be realized in specific hardware.

The exemplary embodiments of the disclosure will be described in greater detail below in a manner that will be understood by one of ordinary skill in the art. However, exemplary embodiments may be realized in a variety of different configurations, and not limited to descriptions provided herein. In order to clearly illustrate the present disclosure in the drawings, portions unrelated to the description may be omitted, and like reference numerals have been assigned to like portions throughout the specification.

Hereinafter, exemplary embodiments will be described in detail with reference to accompanying drawings.

FIG. 1 is a view schematically illustrating a display system including a plurality of display apparatuses according to an exemplary embodiment.

Referring to FIG. 1, a display system 1000 includes a plurality of display apparatuses, 100-1, 100-2, 100-3 and 100-4, and each display apparatus may display the same image at the same time, or different images may be displayed at each display apparatus to form one image in combination.

FIG. 1 illustrates that each of the four display apparatuses, 100-1, 100-2, 100-3, and 100-4, displays a part of an image to depict one image of apples. However, each of the four display apparatuses, 100-1, 100-2, 100-3, and 100-4, may display the same image.

In this case, the four display apparatuses. 100-1, 100-2, 100-3 and 100-4 may be connected in a loop, and the image displayed on four display apparatuses 100-1, 100-2, 100-3 and 100-4 may be input from one external display apparatus and transmitted to another display apparatus sequentially. In this case, if a power failure occurs in one of the display apparatuses, data cannot be transmitted from the display apparatus where power failure occurs and the data cannot be transmitted to other display apparatuses which are supposed to receive the data sequentially.

Alternatively, the four display apparatuses, 100-1, 100-2, 100-3 and 100-4 may be connected to an external source and receive image data respectively from the external source. In this case, if power failure occurs in one of the display apparatuses, there is no influence on the data reception of the other display apparatuses and thus, only the display apparatus in which the power failure occurs is not operated.

According to an exemplary embodiment, if power failure occurs in one of a plurality of display apparatuses, the remaining display apparatuses may share power themselves to recover from the power failure without adding a separate element. The configuration and operation thereof will be described in detail with reference to FIGS. 2 to 7.

Although four display apparatuses are illustrated in the above exemplary embodiment, this is only for convenience of explanation, and the number of display apparatuses forming the display system 1000 is not limited thereto.

Figure 2:
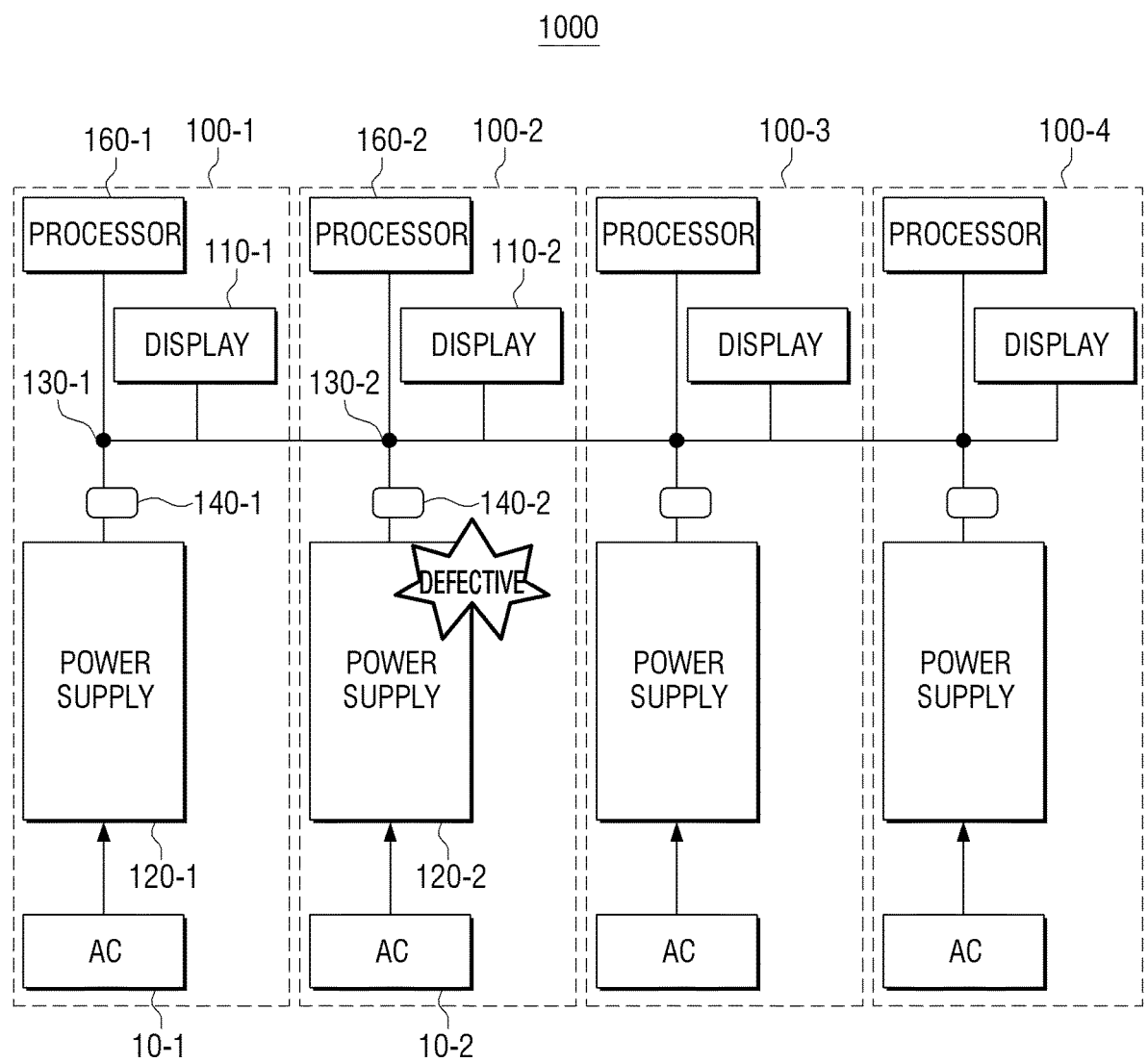
FIG. 2 is a view illustrating a structure of a display system including a plurality of display apparatuses according to an exemplary embodiment.

FIG. 2 is a view illustrating the structure of a display system including a plurality of display apparatuses according to an exemplary embodiment.

Referring to FIG. 2, the display system 1000 includes the first to the fourth display apparatuses, 100-1, 100-2, 100-3 and 100-4. Specifically, the first display apparatus 100-1 includes a display 110-1, a power supply 120-1, an input/output port 130-1, a detector 140-1, and a processor 160-1. The second display apparatus 100-2 may also include a display 110-2, a power supply 120-2, an input/output port 130-2, a detector 140-2, and a processor 160-2. The third and the fourth apparatuses may include the same elements as the first and the second display apparatuses.

The power supply 120-1 of the first display apparatus 100-1 may receive alternating current (AC) power 10-1, convert the AC power to direct current (DC) power, and provide the converted DC power to each element of the display apparatus 100-1. Specifically, the power supply 120-1 may output the DC power and provide the DC power to the processor 160-1 and the display 110-1. In this case, the power supply 120-1 may output 24V, which is the driving voltage of the display apparatus 100-1 and provide the voltage to the processor 160-1 and the display 110-1. The driving voltage of the processor 160-1 may be 13V and thus, the processor 160-1 may have a converter for converting the voltage of 24V to 13V and use the converted voltage.

The detector 140-1 may detect a power output state of the power supply 120-1. In addition, the detector 140-1 may be connected to a detector of another display apparatus and share a power output state of each display apparatus.

The operations of each element of the second to the fourth display apparatuses, 100-2, 100-3 and 100-4, are the same as those of each element of the first display apparatus 100-1 described above.

In this case, each of the first to fourth display apparatuses, 100-1, 100-2, 100-3 and 100-4, may be connected in parallel. To be specific, the power supply of each of the first to fourth external devices, 100-1, 100-2, 100-3 and 100-4, may be connected in parallel through the input/output ports 130-1, 130-2 provided on the display apparatus. In this case, a DC output terminal of each power supply may be connected in parallel through an input/output port of each display apparatus, and the input/output port of each display apparatus may be connected via cable.

According to an exemplary embodiment, each display apparatus may not be connected in parallel under normal operation. However, a switch may be provided for parallel connection in case of an event such as a power failure of one of the display apparatuses.

Accordingly, the first to the fourth display apparatuses, 100-1, 100-2, 100-3 and 100-4, may share DC power. Therefore, if it is detected that the power output state of one of the parallel-connected display apparatuses is defective, the display apparatus having the defective power output state may be operated using the power of the remaining display apparatuses.

For example, if a power output failure occurs in the power supply 120-2 of the second display apparatus 100-2 which receives the input of the AC power 10-2, the detector 140-2 may detect this power output failure and share the detected power state information with each detector of the other display apparatuses, that is, the first, the third and the fourth display apparatuses, 100-1, 100-3 and 100-4. The operations of the third and the fourth display apparatuses 100-3 and 100-4 are the same as those of the first display apparatus 10-1 and thus, only the first display apparatus 100-1 will be described.

If a power output failure is detected in the second display apparatus 100-2 which is connected to the detector 140-1 of the first display apparatus 100-1 by the detector 140-2 of the second display apparatus 100-2, the processor 160-1 of the first display apparatus 100-1 may obtain power to be provided to the second display apparatus 100-2 by reducing power consumption of the first display apparatus 100-1. Specifically, the processor 160-1 of the first display apparatus 100-1 may obtain power by reducing the brightness value of the image occupying the largest portion of the power consumption by a predetermined ratio and supply the obtained power to the second display apparatus 100-2.

According to the above exemplary embodiment, a processor included in each of a plurality of displays reduces a brightness value and the like by a predetermined ratio to reduce power consumption. However, according to another embodiment, if each of the plurality of display apparatuses is connected to an external apparatus to receive data, a control command and the like from the external apparatus, power consumption can be reduced by the control of the external apparatus.

Although the power supply of each display apparatus is connected in parallel to supply power to a display apparatus having a defective power output state from another display apparatus, according to another exemplary embodiment, power can be also supplied by the control of the processor. For instance, a processor may be configured to control power supply to a second display apparatus, in response to receiving information indicating that a power supply of the second display apparatus is defective. The processor may directly supply power through a connector configured to facilitate the power supply to the second display apparatus. According to an exemplary embodiment, the connector may be the input/output port 130 illustrated in FIG. 3.

The third and the fourth display apparatuses, 100-3 and 100-4, may perform the same operations as the first display apparatus 100-1. In this case, the power supplied from the first display apparatus 100-1, the third display apparatus 100-3 and the fourth apparatus 100-4 to the second display apparatus, 100-2, may be provided to the processor 160-2 and the display 110-2 so that the second display apparatus 100-2 can display an image and the first to the fourth display apparatuses, 100-1, 100-2, 100-3 and 100-4, can operate in a normal or a substantially normal manner. For instance, the first to the fourth display apparatuses, 100-1, 100-2, 100-3 and 100-4, can operate as a video wall in a normal or a substantially normal manner. However, since the first to the fourth display apparatuses, 100-1, 100-2, 100-3 and 100-4, are controlled so as to reduce power consumption, the brightness value of the entire image may be reduced and the image can be displayed may be darkened.

As described above, as the power supply of the plurality of display apparatuses are connected in parallel, even if one of the display apparatuses has a defective power output state, the power of another display apparatus can be shared and thus, the user convenience can be improved.

The specific operation of each element of a display apparatus will be described in detail with reference to FIGS. 3 and 4 according to exemplary embodiments.

Figure 3:
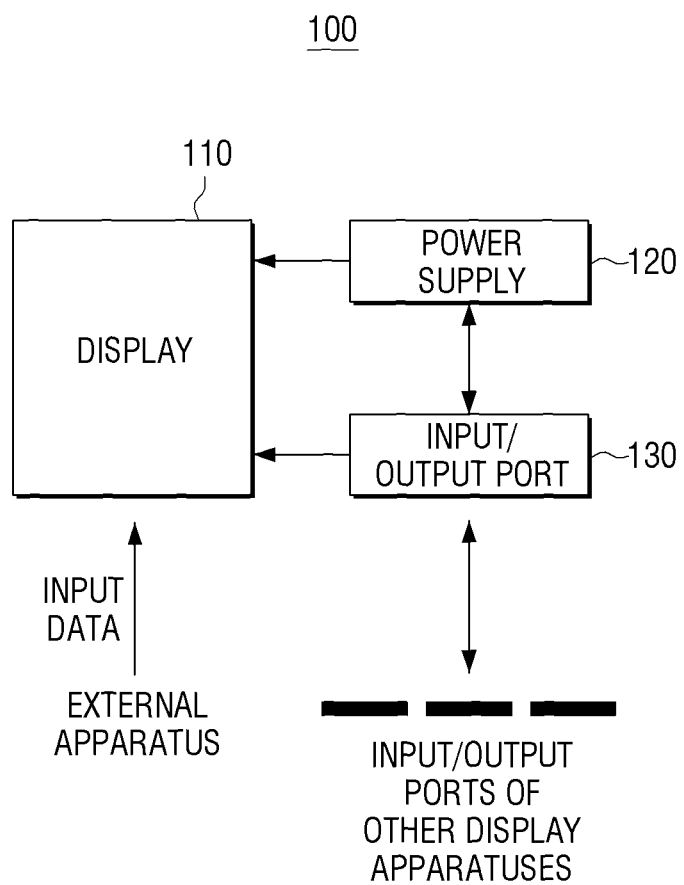
FIG. 3 is a block diagram illustrating a configuration of a plurality of display apparatuses forming a display system according to an exemplary embodiment.

FIG. 3 is a block diagram illustrating configuration of one of the plurality of display apparatuses forming a display system according to an exemplary embodiment.

Referring to FIG. 3, the display apparatus 100 includes the display 110, the power supply 120 and the input/output port 130.

The display 110 may display an image corresponding to data input from outside. Specifically, the display 110 may display an image corresponding to a predetermined area of the input data. For example, if the display apparatus 100 is disposed in the upper left side of the plurality of apparatuses, the display 110 may display an image corresponding to the upper left side of the input image which is divided into four parts. As such, the display system allows each display apparatus to display a partial area of the image, respectively, thereby displaying the entire image. According to another exemplary embodiment, each display apparatus may display the same image.

The power supply 120 supplies power to the display apparatus 100. Specifically, the power supply 120 may receive AC power, convert the AC power to DC power, and provide the converted DC power to each element of the display apparatus 100.

For example, if the power required to drive the processor is 13V and the power required to drive the display 110 is 24V, the power supply 120 may generate a plurality of DC power supplies of 13V and 24V and provide the generated power supplies to each element. Alternatively, if the power supply 120 has a converter capable of converting 24V to 13V, the processor may generate only 24V and if the processor has a converter capable of converting 13V to 24V, the power supply 120 may generate only 13V and provide the generated power to each element. In this case, the power supply 120 may be switched mode power supply (SMPS).

The power supply 120 may supply DC power to another display apparatus which is connected in parallel. Specifically, the DC output end of the power supply 120 and the DC output end of another display apparatus may be connected in parallel through the input/output port 130. In this case, the input/output port 130 may be a terminal which can be connected to the input/output port of another display apparatus via cable. Here, the input/output port 130 may be a display port (DP), a high-definition multimedia interface (HDMI) port, a universal asynchronous receiver/transmitter (UART) port, etc.

If the power supply 120 generates a plurality of DC power supplies, the input/output port 130 may be a plurality of terminals which connect the plurality of DC power supplies in parallel, respectively. Specifically, the input/output port 130 may include a terminal connecting in parallel the DC output ends provided to each processor from the respective power supply of the plurality of display devices, and a terminal connecting in parallel the DC output ends provided to each display from the respective power supply of the plurality of display apparatuses.

As such, as the power supply 120 is connected to the power supply of other display apparatuses in parallel, it becomes possible to share power between the plurality of display apparatuses. Thus, when there is a problem in the power output of one of the display apparatuses, the problem can be overcome without an additional separate element.

Figure 4:
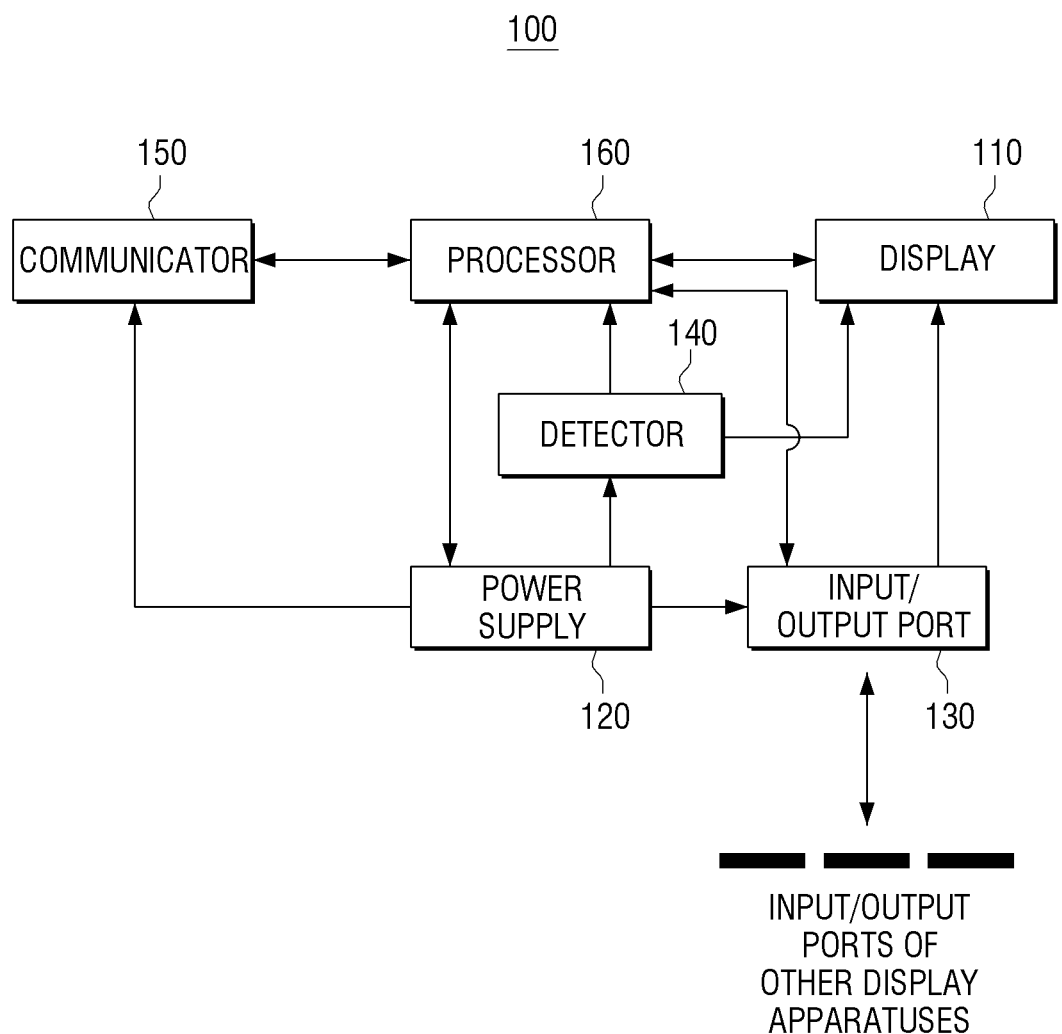
FIG. 4 is a block diagram illustrating a structure of the display apparatus of FIG. 3 according to an exemplary embodiment.

FIG. 4 is a block diagram illustrating a structure of the display apparatus of FIG. 3 according to an exemplary embodiment.

Referring to FIG. 4, the display apparatus 100 includes the display 110, the power supply 120, the input/output port 130, the detector 140, the communicator 150, and the processor 160.

The display 110 performs the same operation as the display illustrated in FIG. 3 and thus, redundant description will be omitted.

The power supplier 120 may supply power to each element of the display apparatus 100. Specifically, the power supply 120 may supply power to the display 110, the communicator 150 and the processor 160 so that each element can operate.

In addition, the power supply 120 may reduce power supplied to each configuration under the control of the processor 160 and supply extra power to another display apparatus. In this case, the power supply 120 may supply the extra power to another display apparatus through the input/output port 130.

The detector 140 may detect the power output state of the power supply 120. Specifically, the detector 140 may be connected to the power supply 120 and detect the power output state of the power supply 120. In this case, the detector 140 may be connected to the DC output end of the power supply 120 and detect the DC power output state of the power supply 120. While FIG. 4 illustrates that the power output from the power supply 120 is provided to the processor 160 and the display 110 from the detector 140, respectively, this is only for convenience of explanation. The power can be supplied to each element by a separate element, and there may be a plurality of detectors 140 to detect the output state of power provided to the processor 160 and the display 110.

In addition, the detector 140 may be connected to a detector of another display apparatus and share a power output state of the display apparatus to the other display apparatus and vice versa. Here, the detector 140 may be a load share integrated circuit (IC). The load share IC provided on each display apparatus may be connected to each other and share the power output state of each power supply. In this case, by sharing the power output state, the display apparatus 100 may identify the number and location of display apparatuses, which have a defective power output state with each other.

According to an exemplary embodiment, the detector 140 is a separate element, but this is only an example. According to another exemplary embodiment, the detector 140 may be an element included in the processor 160 instead of a separate element, or may be an element included in the power supply 120. In this case, each processor or each power supply of the plurality of display apparatuses may be connected to share the power output state.

The communicator 150 may perform communication with an external apparatus. Specifically, the communicator 150 may receive image data or a control command from an external apparatus and transmit the received image data or control command to another display apparatus.

The communicator 150 may perform communication with at least one other display apparatus. Specifically, if the display apparatus 100 is not connected to an external apparatus, the communicator 150 may receive image data or a control command from another display apparatus. Here, the received image data or control command may be received by another display apparatus from an external apparatus to which the other display apparatus is connected. Subsequently, the communicator 150 may transmit the received image data or control command to yet another display apparatus.

FIG. 4 illustrates that the communicator 150 is a separate element, but according to an exemplary embodiment, the communicator 150 may be the same element as the input/output port 130. In this case, the communicator 150 may operate in a wired manner using at least one of HDMI, Digital Visual Interface (DVI), Red Green Blue (RGB), D-Subminiature (DSUB), Super Video (S-Video), Component Video, and Composite Video which is a connection port provided in the display apparatus 100. The communicator 150 may operate not only in a wired manner but also in a wireless manner using Global System for Mobile communication (GSM), a Universal Mobile Telecommunications System (UMTS), a Long Term Evolution (LTE), a Wireless Broadband Internet (WiBRO), a Wireless Fidelity (WiFi), etc.

The processor 160 may control each element of the display apparatus 100. Specifically, if the processor 160 detects a failure in the power output state of at least one of the display apparatus 100 and other display apparatuses based on the detection result shared by the detector 160, it may be possible to reduce the power consumption of the display apparatus 100.

Specifically, if a failure occurs in the power supply of another display apparatus, the processor 160 may reduce the power consumption in order to supply constant power to the other display apparatuses. In this case, if part of necessary power cannot be supplied from the power supply 120 due to a failure in the power supply 120 of the display apparatus 100, the processor 160 may be operated by the power supplied from the power supply 120 and thus, reduce the power consumption of the display apparatus 100. In this case, the display apparatus 100 may be operated by the power supplied from the power supply 120 and the power supplied from other display apparatuses. If it is not possible to receive all of the required power from the power supply 120 due to a failure in the power supply 120 of the display apparatus 100, the processor 160 may be operated by the power supplied from other display apparatus and thus, reduce the power consumption of the display apparatus 100. In this case, the display apparatus 100 may be operated only by the power provided from the other display apparatus.

Here, the processor 160 may control the display apparatus 100 to reduce the brightness value of the image displayed on the display 110 by a predetermined ratio. Specifically, the processor 160 may control the backlight of the display apparatus 100, which takes up significant portion of the power consumption to lower the brightness of the image in order to reduce the power consumption.

In this case, the predetermined ratio may correspond to the number of display apparatuses with a defective power supply. For example, in a video wall including a total of nine display apparatuses, when the power supply of one display device is defective, the brightness of the remaining eight display apparatuses is reduced by 15% so that the generated extra power can be provided to the display apparatus where the power failure occurs. If the power failure occurs in two display apparatus, the brightness of the remaining seven display apparatuses is reduced by 30% so that the generated extra power can be provided to the two display apparatus where power failure occurs.

The above-described predetermined ratio is only an example, according to an exemplary embodiment, the ratio may vary depending on the power supply capacity of the power supply, the power consumed by the backlight, etc.

The above exemplary embodiment illustrates a case in which the power consumption is reduced by reducing the brightness value of the image, according to an exemplary embodiment, if the audio of the image is not required, the power supplied to the speaker may be cut off or the power of other unnecessary elements can be cut off in order to reduce the power consumption.

According to an exemplary embodiment, when a failure in the power output state of at least one of the other display apparatuses is detected based on the detection result shared by the detector 140, the processor 160 may control the display 110 to display a UI for receiving a user's selection regarding whether to reduce the power consumption of the display apparatus 100 based on the number of detected defective display apparatuses.

Figure 6:
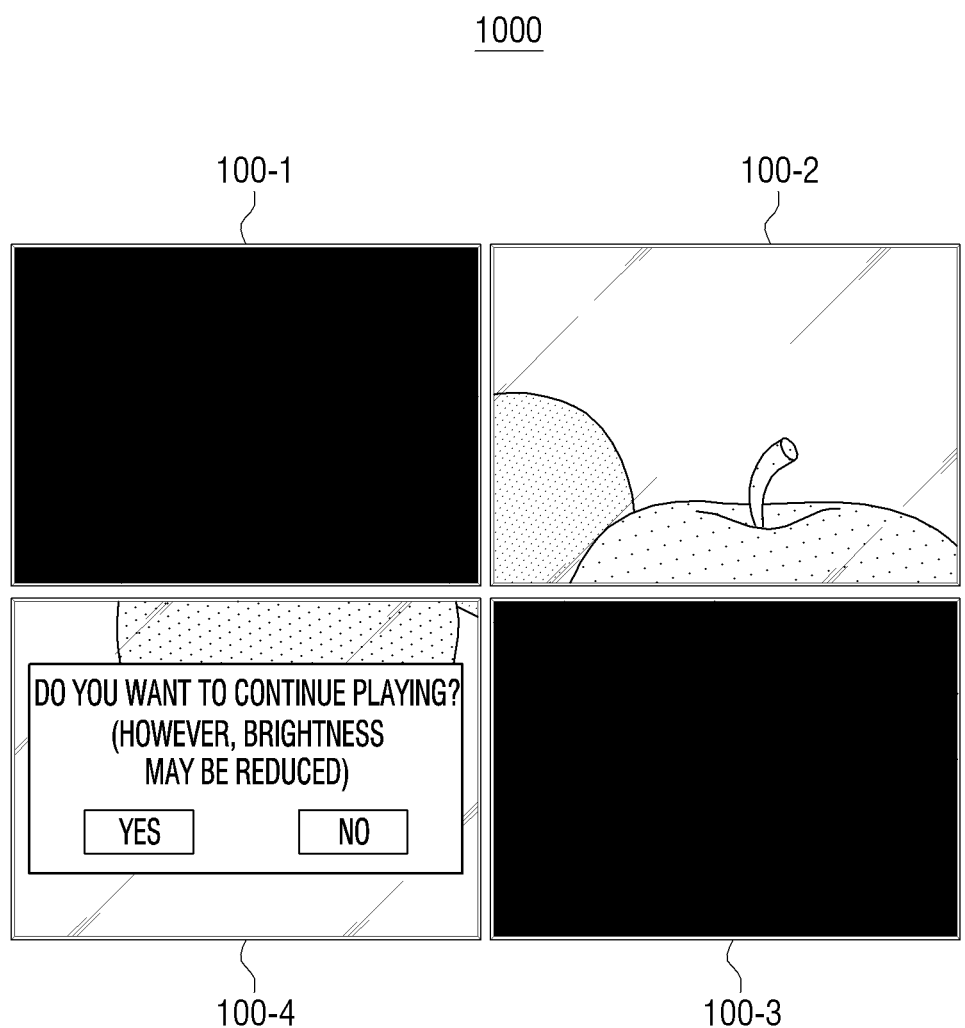
FIG. 6 is a view illustrating a user interface (UI) which is displayed to receive a user's selection when a power failure occurs in one or more of the display apparatuses according to an exemplary embodiment.

Specifically, if the number of detected display apparatuses is greater than a predetermined value, the processor 160 may not reduce the power consumption immediately. Instead, according to an exemplary embodiment, the processor may be configured to receive a user's selection regarding whether to operate the display apparatuses having a defective power state by reducing the power consumption. In this case, as illustrated in FIG. 6, the processor 160 may display a UI for receiving a user's selection on the display 110, or may notify or inform the user using audio output, etc. and may receive a user's selection. In this case, the user may select whether to reduce the power consumption by using a touch input, a remote controller, a voice input, a button and the like provided on the display apparatus 100.

The other operations of the display 110, the power supply 120 and the input/output port 130 are the same as those of the display 110, the power supply 120 and the input/output port 130 illustrated in FIG. 3, and therefore, the redundant description has been omitted.

It is to be understood that the display apparatus 100 may further include a storage, a microphone, a camera, a speaker, etc. which are typically provided in the display apparatus 100 in addition to the elements described above.

According to an exemplary embodiment, as the power supply 120 may be connected to the power supply of other display apparatuses in parallel, it becomes possible to share power between the plurality of display apparatuses. Accordingly, when there is a problem in the power output of one of the display apparatuses, the problem can be overcome without an additional separate element.

Figure 5:
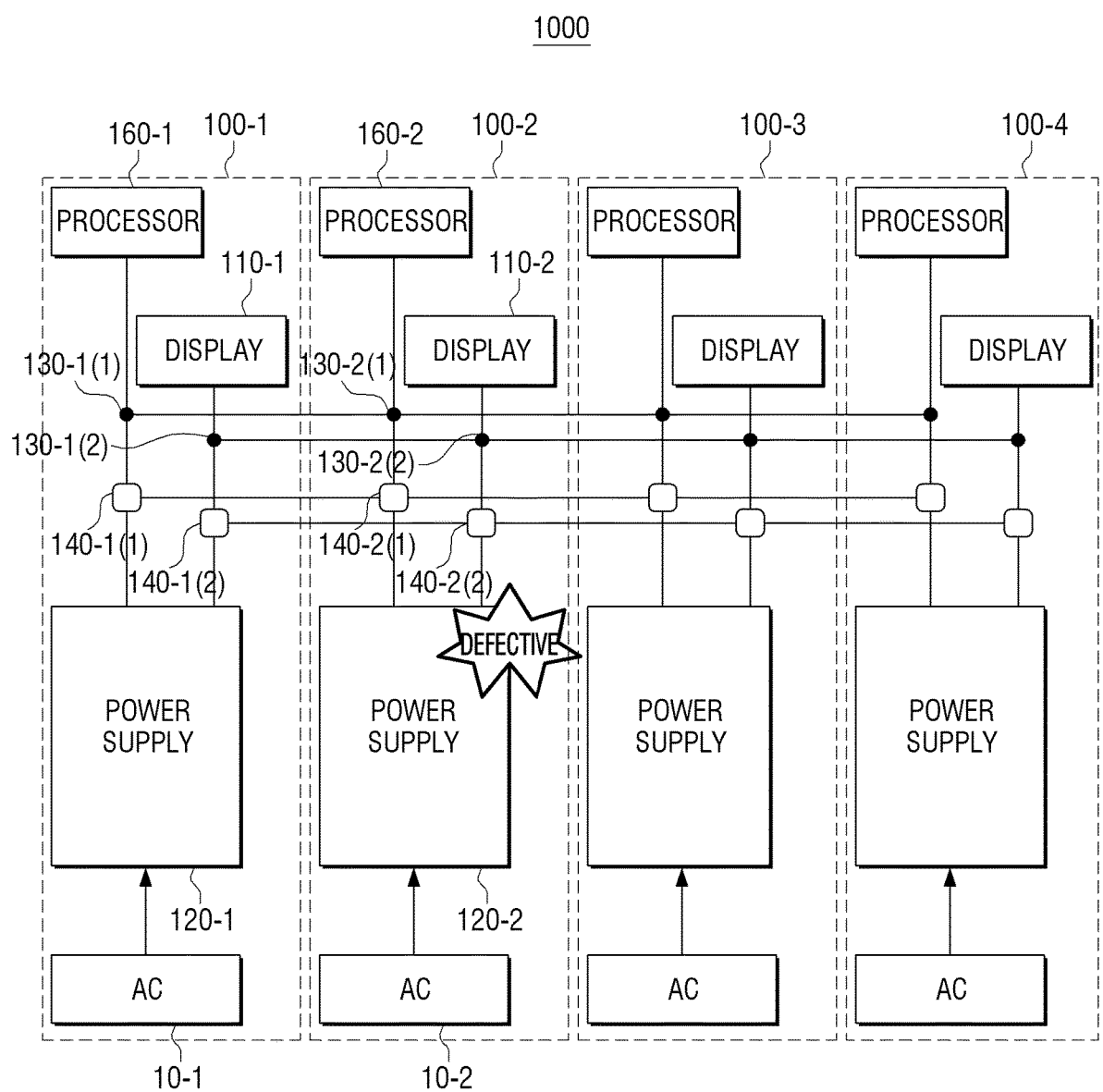
FIG. 5 is a view illustrating a structure of a display system including a plurality of display apparatuses according to another exemplary embodiment.

FIG. 5 is a view illustrating a configuration of a display system including a plurality of display apparatuses according to another exemplary embodiment.

Referring to FIG. 5, the display system 1000 includes the first to the fourth display apparatuses, 100-1, 100-2, 100-3 and 100-4. Specifically, the first display apparatus 100-1 comprises a display 110-1, a power supply 120-1, an input/output port 130-1, a detector 140-1, and a processor 160-1. The second display apparatus 100-2 may also comprise a display 110-2, a power supply 120-2, an input/output port 130-2, a detector 140-2, and a processor 160-2. The third and the fourth apparatuses may comprise the same elements as the first and the second display apparatuses.

The power supply 120-1 of the first display apparatus 100-1 may receive AC power 10-1, convert the AC power to DC power, and provide the converted DC power to each element of the display apparatus 100-1. Specifically, the power supply 120-1 may output the DC power and provide the DC power to the processor 160-1 and the display 110-1. In this case, the power supply 120-1 may output 13V which is the driving voltage of the display apparatus 160-1 and provide the voltage to the processor 160-1 and output 24V which is the driving voltage of the display 100-1 and provide the voltage to the display 110-1.

According to an exemplary embodiment, the detectors 140-1(1) and 140-1(2) may detect the power output state of the power supply 120-1. In addition, the detectors 140-1(1) and 140-1(2) may be connected to the detectors of other display apparatuses and share the power output state of each display apparatus.

According to an exemplary embodiment, the detectors 140-2(1) and 140-2(2) may separately detect to the power output state of the power supply 120-2. For instance, the detector 140-2(1) may detect the power supply to the processor 160-2 to determine if there is a power supply failure to the processor 160-2. Separately, the detectors 140-2(2) may detect the power supply to the display 110-2 to determine if there is a power supply failure to the display 110-2. According to an exemplary embodiment, if it is determined by the processor 160-2 that there is power supply failure to the processor 160-2, a power supply 120-1 of the display apparatus 100-1 may supply power to the processor 160-2 via the input/output port 130-1(1) and input/output port 130-2(1).

According to an exemplary embodiment, another element of the display apparatus 100-1 or another element of another display apparatus, that there is power supply failure to the processor 160-2. Also, the power supply of the other display apparatuses 100-3 and 100-4 may supply power the processor 160-2 in addition to the power supply 120-1 of the display apparatus 100-1. According to an exemplary embodiment, the power supply of the other apparatuses 100-3 and 100-4 may supply power to the processor 160-2 instead of the power supply 120-1 of the display apparatus 100-1.

Similarly, according to an exemplary embodiment, if it is determined that there is power supply failure to the display 110-2, a power supply 120-1 of the display apparatus 100-1 may supply power to the display 110-2 via the input/output port 130-2(1) and input/output port 130-2(2).

The operations of each element of the second to the fourth display apparatuses, 100-2, 100-3 and 100-4, are the same as those of each element of the first display apparatus 100-1 described above.

In this case, each of the first to fourth display apparatuses, 100-1, 100-2, 100-3 and 100-4, may be connected in parallel. To be specific, each power supply of the first to fourth external devices, 100-1, 100-2, 100-3 and 100-4, may be connected in parallel through the input/output port provided in the display apparatus. In this case, a DC output terminal of each power supply may be connected in parallel through an input/output port of each display apparatus, and the input/output port of each display apparatus may be connected via cable.

Here, the input/output port, 130-1(1) and 130-2(1), connecting in parallel the DC output ends which provide power to the processor from each power supply of the first to the fourth display apparatuses, 100-1, 100-2, 100-3 and 100-4, and the input/output port 130-1(2), 130-2(2) connecting in parallel the DC output ends which provide power to the display from each power supply of the first to the fourth display apparatuses, 100-1, 100-2, 100-3 and 100-4, may be provided as separate elements.

Each display apparatus is not generally connected in parallel, but may further include a switch for parallel connection in case of an event such as a power failure of one of the display apparatuses.

According to an exemplary embodiment, the display system may include a node at which the power supply from the first display apparatus and power supply from one or more third display apparatus, different from the second display apparatus, are aggregated and supplied to the second display apparatus.

Accordingly, the first to the fourth display apparatuses, 100-1, 100-2, 100-3 and 100-4, may share DC power. Therefore, if it is detected that the power output state of one of the parallel-connected display apparatuses is defective, the display apparatus having the defective power output state may be operated using the power of the remaining display apparatuses.

For example, if a power output failure occurs in the power supply 120-2 of the second display apparatus 100-2 which receives the input of the AC power 10-2, the detector 140-2 may detect this power output failure and share the detected power state information with each detector of the other display apparatuses, that is, the first, the third and the fourth display apparatuses 100-1, 100-3 and 100-4. The operations of the third and the fourth display apparatuses 100-3 and 100-4 are the same as those of the first display apparatus 10-1 and thus, only the first display apparatus 100-1 will be described.

If a power output failure is detected in the second display apparatus 100-2 to which the detectors 140-1(1) and 140-1(2) of the first display apparatus 100-1 are connected based on the detection result by the detectors 140-2(1) and 140-2(2) of the second display apparatus 100-2, the processor 160-1 of the first display apparatus 100-1 may reduce power consumption in the first display apparatus 100-1 in order to secure power to be provided to the second display apparatus 100-2. Specifically, the processor 160-1 of the first display apparatus 100-1 may obtain power by reducing the brightness value of the image occupying the largest portion of the power consumption by a predetermined ratio and supply the obtained power to the second display apparatus 100-2.

In this case, the first display apparatus 100-1 may provide power to be provided to the processor 160-2 of the second display apparatus 100-2 through the input/output port 130-1(1) which connects processors in parallel, and provide power to be provided to the display 110-2 of the second display apparatus 100-2 through the input/output port 130-1(2) which connects displays in parallel.

The operations of each element excluding the above-described features have been described in detail with reference to FIGS. 2 to 4 and thus, the redundant description is omitted.

As described above, as the power supply of the plurality of display apparatuses are connected in parallel, even if one of the display apparatuses has a defective power output state, the power of another display apparatus can be shared and thus, the user convenience can be improved.

FIG. 6 is a view illustrating a User Interface (UI) which is displayed to receive a user's selection when a power failure occurs in one or more of the display apparatuses according to an exemplary embodiment.

Referring to FIG. 6, a display system 1000 includes a plurality of display apparatuses, 100-1, 100-2, 100-3 and 100-4, and each display apparatus may display the same image at the same time, or different images may be displayed at each display apparatus to form one image in combination.

Each of the plurality of display apparatuses, 100-1, 100-2, 100-3 and 100-4 may be connected to each other to share power. In this case, if there is a problem in power output in one of the display apparatuses, each of the plurality of display apparatuses, 100-1, 100-2, 100-3 and 100-4 may provide power to the display apparatus where the power problem occurs. However, when there are a large number of defective display apparatuses, it may be difficult for the display system to operate in a viable or a substantially viable since the brightness of the image is may be too dark due to a large amount of power consumption reduction in each display apparatus. In this case, if the number of the display apparatuses with defective power output is greater than a predetermined value, each of the plurality of display apparatuses, 100-1, 100-2, 100-3 and 100-4, may not provide power by reducing power consumption immediately. Instead, the display apparatus may request, and in response, receive a user's selection regarding whether to provide power consumption. In an exemplary embodiment, as illustrated in FIG. 6, a UI for receiving a user's selection may be displayed on a part of all of the display apparatuses having normal power output.

According to an exemplary embodiment, in FIG. 6, it is assumed that while an image is displayed using a total of four display apparatuses which are connected to an external apparatus and receive image data, respectively, a problem occurs in the power output in the first display apparatus 100-1 and the third display apparatus 100-3. In such a case, if the four display apparatuses are connected in a loop form, in which, the second display apparatus 100-2 receives image data from an external apparatus, and the image data is transmitted in an order to the third display apparatus 100-3, the fourth display apparatus 100-4 and the first display apparatus 100-1, the third display apparatus 100-3, the fourth display apparatus 100-4 and the first display apparatus 100-1 may not operate, except for the second display apparatus 100-2 may not operate.

According to an exemplary embodiment, if a problem in power output occurs in other display apparatuses, each display apparatus may perform the operation of reducing power consumption without a user command only when the number of defective display apparatuses is less than a predetermined value. When the number of defective display apparatuses is greater than a predetermined value, whether to perform the operation of reducing power consumption can be confirmed by the user.

For example, if it is set to perform the operation of reducing power consumption without a user command when a problem in power output occurs in one of four display apparatuses, as illustrated in FIG. 6, when a problem in power output occurs in two display apparatuses, the display apparatus having normal power output may display a UI for receiving user's confirmation regarding whether to perform power consumption reduction.

FIG. 6 illustrates that a UI is displayed in only the fourth display apparatus out of the second display apparatus 100-2 and the fourth display apparatus 100-4 which have normal power output, but a UI also be displayed on the second display apparatus 100-2 along with the fourth display apparatus 100-4.

While FIG. 6 illustrates that a UI is displayed for receiving a user's selection, the user may be informed by audio output and the like, and the user's selection may be received. In this case, the user may select whether to reduce the power consumption by using a touch input, a remote controller, a voice input, a button and the like provided on the display apparatus.

FIG. 7 is a flowchart illustrating a power sharing method of a display apparatus according to an exemplary embodiment.

Firstly, the display apparatus may detect a power output state (S710). Specifically, the display apparatus may detect the output state of DC power which is output from a power supply. In this case, the display apparatus may detect the output state of DC power provided to a processor and a display together, or may detect the output state of DC power provided to each of the processor and the display separately.

Subsequently, the display apparatus may transmit the detection result to other display apparatuses which are connected in parallel (S720). According to an exemplary embodiment, the display apparatus may share the detection result with other display apparatuses which are connected in parallel. Specifically, the detector of the display apparatus may be connected to the detectors of other display apparatuses and share the power output states of the display apparatus and other display apparatuses. Here, the detector of the display apparatus may be a separate element such as a load share IC or may be included in a processor or a power supply.

Subsequently, the display apparatus may detect a failure in the power output state (S730). Specifically, the display apparatus may determine the number and position of display apparatuses having a defective power output state based on the power output state of each display apparatus shared by the detector.

Subsequently, the display apparatus may reduce the power consumption (S740). Specifically, the power supply of the display apparatus is connected in parallel to the power supply of the other display apparatuses, and when the power supply output state of the other display apparatus is detected to be defective, the display apparatus reduces the power consumption and provide the extra power to the other display apparatus. If it is detected that the power output state of the display apparatus is defective, the display apparatus may reduce the power consumption and receive extra power from other display apparatuses to operate the processor, the display and the like.

In this case, the display apparatus may reduce the power consumption by reducing the brightness value of an image. Accordingly, when at least one of the display apparatus and the other display apparatuses is defective in the power output state, the display apparatus may display a darker image than in the normal operation mode.

According to the above-described various exemplary embodiments, the parallel connection of the respective power output ends enables power sharing between the plurality of display apparatuses and thus, if a problem occurs in the power output in one of the display apparatuses, the problem can be overcome without an additional element.

Various exemplary embodiments described above may be embodied in a recording medium that may be read by a computer or a similar apparatus to the computer by using software, hardware, or a combination thereof. According to the hardware embodiment, exemplary embodiments that are described in the present disclosure may be embodied by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, the exemplary embodiments can be implemented by the processor 120. According to the software embodiment, various embodiments of procedures and functions described in the specification may be implemented with separate software modules. Each of the software modules may perform one or more functions and operations described in the present specification.

The controlling method of the display apparatus according to the various exemplary embodiments may be stored on a non-transitory readable medium. The non-transitory readable medium may be installed and used in various apparatuses.

The non-transitory readable medium refers to a medium which may be readable by machine, a processor, and the like, and may store data semi-permanently unlike a register, a cache, or a memory that stores data for a short time. Specifically, programs of performing the above-described various methods can be stored in a non-transitory computer readable medium such as a CD, a DVD, a hard disk, a Blu-ray disk, universal serial bus (USB), a memory card, ROM, or the like, and can be provided.

The foregoing embodiments are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A display apparatus, comprising:
   a display configured to display a first part of an image;
   a power supply configured to supply power to the display apparatus;
   an input/output port configured to connect in parallel the power supply and another power supply of another display apparatus that displays a second part of the image, wherein the input/output port comprises a first terminal, which directly connects the power supply of the display apparatus with a second terminal of another input/output port of the other display apparatus; and
   a processor configured to, in response to detecting a failure of the other power supply of the other display apparatus, control the display to display a user interface for receiving an input selection regarding whether to reduce power consumption in the display apparatus based on a number of display apparatuses having defective power supply.

2. The display apparatus as claimed in claim 1, further comprising:
   a detector configured to detect a power output state of the power supply and generate a detection result, wherein the processor is further configured to transmit the detection result to the other display apparatus.

3. The display apparatus as claimed in claim 2, wherein the processor is further configured to reduce the power consumption in the display apparatus in response to detecting one of a failure of the power supply of the display apparatus based on the detection result, and the failure of the other power supply of the other display apparatus based on power state information received from the other display apparatus.

4. The display apparatus as claimed in claim 3, wherein the processor is further configured to control the display to reduce a brightness value of the image displayed on the display by a predetermined ratio.

5. The display apparatus as claimed in claim 4, wherein the predetermined ratio corresponds to the number of display apparatuses having the defective power supply.

6. The display apparatus as claimed in claim 1, wherein the input/output port is connected to the other input/output port of the other display apparatus via a cable.

7. The display apparatus as claimed in claim 1, wherein the power supply is configured to generate a plurality of direct current (DC) power levels, and
   wherein the input/output port includes a plurality of terminals which connect in parallel each of the plurality of DC power levels.

8. The display apparatus as claimed in claim 1, wherein the processor is further configured to control the display to reduce a brightness value of the image displayed on the display by a predetermined ratio corresponding to the number of display apparatuses having the defective power supply.

9. The display apparatus as claimed in claim 1, wherein the processor is further configured to control the display to reduce a brightness value of a portion of the image occupying largest amount of power consumption in response to detecting one of a failure of the power supply of the display apparatus, and the failure of the other power supply of the other display apparatus.

10. The display apparatus as claimed in claim 1, wherein the input/output port comprises a third terminal, which directly connects a DC terminal of the display with a fourth terminal of the other input/output port of the other display apparatus.

11. The display apparatus as claimed in claim 10, wherein the input/output port comprises a fifth terminal, which directly connects a DC terminal of the processor within the display apparatus with a sixth terminal of the other input/output port of the other display apparatus.

12. A controlling method of a display apparatus, the controlling method comprising:

receiving power state information of another display apparatus, which is connected in parallel with the display apparatus;

detecting a failure of another power supply of the other display apparatus based on the power state information that is received; and in response to detecting the failure of the other power supply of the other display apparatus, controlling a display of the display apparatus to display a user interface for receiving an input selection regarding whether to reduce power consumption in the display apparatus based on a number of display apparatuses having defective power supply, wherein the power state information of the other display apparatus is received through a first terminal of an input/output port of the display apparatus, wherein the first terminal directly connects with a second terminal of another input/output port of the other display apparatus, and wherein the second terminal directly connects to the other power supply of the other display apparatus.

13. The controlling method as claimed in claim 12, further comprising:

detecting a power output state of the display apparatus;

transmitting a result of the detecting to the other display apparatus through the input/output port which connects in parallel a power supply of the display apparatus and the other power supply of the other display apparatus; and in response to the detecting a failure of the power supply of the display apparatus based on the result of the detecting, reducing the power consumption in the display apparatus.

14. The controlling method as claimed in claim 13, wherein the input/output port is connected to the other input/output port of the other display apparatus via a cable.

15. The controlling method as claimed in claim 14, wherein the power supply of the display apparatus generates a plurality of direct current (DC) power levels, and wherein the input/output port includes a plurality of terminals which connect in parallel each of the plurality of DC power levels.

16. The controlling method as claimed in claim 12, wherein the reducing the power consumption comprises reducing a brightness value of an image displayed on the display by a predetermined ratio.

17. The controlling method as claimed in claim 16, wherein the predetermined ratio corresponds to the number of display apparatuses having the defective power supply.

18. A non-transitory computer readable recording medium including a program to execute a controlling method of a display apparatus, wherein the controlling method of the display apparatus comprises:

receiving power state information of another display apparatus, which is connected in parallel with the display apparatus;

detecting a failure of a another power supply of the other display apparatus based on the power state information that is received; and in response to detecting the failure of the other power supply of the other display apparatus, controlling a display of the display apparatus to display a user interface for receiving an input selection regarding whether to reduce power consumption in the display apparatus based on a number of display apparatuses having defective power supply, wherein the power state information of the other display apparatus is received through a first terminal of an input/output port of the display apparatus, wherein the first terminal directly connects with a second terminal of another input/output port of the other display apparatus, and wherein the second terminal directly connects to the other power supply of the other display apparatus.

19. A display system comprising:

a plurality of display apparatus, wherein a first display apparatus, among the plurality of display apparatus, comprises:

a display configured to display content;

a first power supply configured to provide power to the display;

a processor configured to control providing of power to a second display apparatus, in response to receiving information indicating that a second power supply of the second display apparatus is defective; and a first input/output port comprising a first terminal, which directly connects the first power supply of the first display apparatus with a second terminal of a second input/output port of the second display apparatus, the second terminal being directly connected to the second power supply of the second display apparatus, wherein the processor is further configured to, in response to detecting a failure of the second power supply of the second display apparatus, control the display to display a user interface for receiving an input selection regarding whether to reduce power consumption in the first display apparatus through the first power supply based on a number of display apparatuses having defective power supply.

20. The display system according to claim 19, wherein the processor of the first display apparatus is further configured to control the first power supply of the first display apparatus to provide the power to the second display apparatus.

21. The display system according to claim 19, wherein the processor of the first display apparatus is further configured to control the first display apparatus to operate in a first power state that is lower than a second power state, the second power state being a power state at which the first display apparatus operates at prior to the processor controlling the providing of the power to the second display apparatus.

22. The display system according to claim 19, wherein the first display apparatus further comprises a connector configured to facilitate the providing of the power to the second display apparatus.

* * * * *